US010603695B2

(12) United States Patent
Pourcher et al.

(10) Patent No.: US 10,603,695 B2
(45) Date of Patent: Mar. 31, 2020

(54) DEVICE FOR THE DRY-CLEANING OF AN ADDITIVE MANUFACTURING PLATE

(71) Applicant: COMPAGNIE GENERALE DES ETABLISSEMENTS MICHELIN, Clermont-Ferrand (FR)

(72) Inventors: Benoît Pourcher, Clermont-Ferrand (FR); Gilles Walrand, Clermont-Ferrand (FR); Frédéric Pialot, Clermont-Ferrand (FR); Albin Effernelli, Clermont-Ferrand (FR); Miguel Torres-Castellano, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 235 days.

(21) Appl. No.: 15/743,517

(22) PCT Filed: Jul. 29, 2016

(86) PCT No.: PCT/EP2016/068239
§ 371 (c)(1),
(2) Date: Jan. 10, 2018

(87) PCT Pub. No.: WO2017/017273
PCT Pub. Date: Feb. 2, 2017

(65) Prior Publication Data
US 2018/0236504 A1    Aug. 23, 2018

(30) Foreign Application Priority Data
Jul. 30, 2015 (FR) ...................................... 15 57318

(51) Int. Cl.
*B08B 7/04* (2006.01)
*B08B 7/02* (2006.01)
(Continued)

(52) U.S. Cl.
CPC .................. *B08B 7/04* (2013.01); *B08B 5/04* (2013.01); *B08B 7/02* (2013.01); *B29C 64/35* (2017.08);
(Continued)

(58) Field of Classification Search
CPC .... B08B 7/04; B08B 5/04; B08B 7/02; B08B 3/12; B33Y 40/00; B29C 64/35
See application file for complete search history.

(56) References Cited

U.S. PATENT DOCUMENTS

| 6,932,935 B1 | 8/2005 | Oberhofer et al. ........... 264/497 |
| 2001/0045678 A1 | 11/2001 | Kubo et al. ................ 264/37.29 |

(Continued)

FOREIGN PATENT DOCUMENTS

| EP | 1 192 040 A2 | 4/2002 |
| EP | 1 793 979 A2 | 6/2007 |

(Continued)

OTHER PUBLICATIONS

International Search Report issued by WIPO dated Oct. 26, 2016, 2016, in connection with International Application No. PCT/EP2016/068239 (with English translation attached).

(Continued)

*Primary Examiner* — Shay Karls
(74) *Attorney, Agent, or Firm* — Venable LLP

(57) ABSTRACT

A device is provided for dry cleaning a plate used in an additive manufacturing process that involves powder. The device includes a confinement enclosure, a loader, and a dry-cleaning station. The confinement enclosure includes an entry lock through which a plate to be cleaned enters. The loader is located within the confinement enclosure and is structured to receive and transport the plate. The dry-cleaning station is located within the confinement enclosure and is structured to dry clean the plate. The dry-cleaning (Continued)

station includes a vibration device, which imposes vibrations on the plate, and a shock device, which causes the plate to experience shocks.

16 Claims, 8 Drawing Sheets

(51) Int. Cl.
    *B33Y 40/00*     (2020.01)
    *B29C 64/35*     (2017.01)
    *B08B 5/04*     (2006.01)
    *B08B 3/12*     (2006.01)
    *B29K 105/00*     (2006.01)

(52) U.S. Cl.
    CPC ............... *B33Y 40/00* (2014.12); *B08B 3/12* (2013.01); *B29K 2105/251* (2013.01)

(56) References Cited

U.S. PATENT DOCUMENTS

| | | | |
|---|---|---|---|
| 2014/0065194 A1* | 3/2014 | Yoo | B33Y 10/00 424/400 |
| 2014/0363585 A1 | 12/2014 | Pialot et al. | B22F 7/02 |
| 2016/0279871 A1 | 9/2016 | Heugel et al. | B29C 67/0077 |
| 2017/0304897 A1 | 10/2017 | Walrand et al. | B22F 3/1055 |
| 2018/0193887 A1 | 7/2018 | Pourcher et al. | |
| 2018/0215097 A1 | 8/2018 | Pourcher et al. | |

FOREIGN PATENT DOCUMENTS

| | | |
|---|---|---|
| WO | WO 90/03893 A1 | 4/1990 |
| WO | WO 97/28909 A1 | 8/1997 |
| WO | WO 2015/071184 A1 | 5/2015 |
| WO | WO-2015071184 A1 * | 5/2015 |

OTHER PUBLICATIONS

Written Opinion published by WIPO dated Feb. 2, 2017, in connection with International Application No. PCT/EP2016/068239 (in French; no English translation presently is available).
Oct. 26, 2016 International Search Report and Written Opinion in International Patent Appln. No. PCT/EP2016/068239.
B. Pourcher, U.S. Appl. No. 15/743,475, filed Jul. 29, 2016.
B. Pourcher, U.S. Appl. No. 15/743,532, filed Jul. 29, 2016.

* cited by examiner

DEVICE FOR THE DRY-CLEANING OF AN ADDITIVE MANUFACTURING PLATE

FIELD OF THE INVENTION

The invention falls within the field of powder-based additive manufacturing by sintering or melting grains of such powder using a beam of energy involving electromagnetic radiation, such as a laser beam for example, and/or a beam of particles, such as an electron beam for example.

More specifically, the invention relates to the cleaning of the additive manufacturing plates and of the components manufactured on these plates.

RELATED ART

When an additive manufacturing process is conducted in an additive manufacturing machine, a first layer of powder is deposited on an additive manufacturing plate mounted with the ability to slide inside an enclosure surrounding the manufacturing plate. Next, this first layer of powder is consolidated according to a predetermined design using one of the aforementioned beams of energy. Then, the manufacturing plate is lowered within its enclosure so as to allow a second layer of powder to be deposited and consolidated. Finally, the steps of lowering the plate and then depositing and consolidating layers of powder follow on from one another until the last layer of powder needed in the manufacture of the components that are to be produced has been deposited and consolidated.

In one disadvantage encountered at the end of this additive manufacturing process, the component or components manufactured find themselves immersed in a significant quantity of unconsolidated powder which needs to be removed.

According to one method, the manufacturing plate is taken out of the machine, with or without its enclosure, and an operator clears away the grains of powder by hand, using tools such as a brush and a compressed-air blower or extraction fan.

Because of its essentially manual nature, this first cleaning method is not really compatible with industrial application.

In addition, this manual cleaning may be dangerous to the operator because the powders used in additive manufacturing generally contain toxic chemical compounds which could be inhaled by the operators in spite of the protective equipment they have.

Finally, according to another disadvantage, if the unconsolidated powder is not kept under a protective atmosphere during cleaning, it has to undergo various processing operations before it can be reused.

For this reason, some manufacturers of additive manufacturing machines have modified their machines in order better to protect the health of the operators and in order to be able to reuse immediately the powder derived from the cleaning of the manufactured components.

For example, the additive manufacturing machine described in European patent EP1793979 is equipped with means that allow an operator to handle and clean the manufactured parts in the manufacturing enclosure of the machine.

More specifically, these means comprise openings made in a wall of the manufacturing enclosure, a robot arm installed in the manufacturing enclosure, and a suction pipe that can be manipulated in this manufacturing enclosure. In addition, the openings are fitted with protective gloves allowing an operator to introduce his hands into the manufacturing enclosure in order to clean the manufactured components using the suction pipe, and the operator can control the robot arm from outside the machine in order to move heavier components more easily.

Thanks to the means described in European patent EP1793979, the operator is protected and the unconsolidated powder is kept under a protective atmosphere.

However, the cleaning is still a manual operation requiring the work of an operator, and because this manual cleaning takes place inside the manufacturing enclosure of the machine, this machine cannot be used for manufacturing further components throughout the duration of the cleaning.

So, European patent EP1192040 makes provision for manufacturing the components in a removable container which can be removed from the manufacturing enclosure of the additive manufacturing machine and taken to a cleaning device independent of this machine.

In a first embodiment of this cleaning device, a lid provided with two openings facing one another is placed on the top of the container, and a compressed-air source is connected to the first opening while a reservoir is connected to the second opening. Thus, and by gradually raising the manufacturing plate and the manufactured components towards the top of the container, the stream of compressed air drives the unconsolidated powder towards the second opening and therefore into the reservoir.

According to one disadvantage of this first embodiment, there is a risk of the powder becoming contaminated with the flow of compressed air used for driving the powder towards the reservoir.

In a second embodiment, the top of the container is fitted with a flared neck comprising a spout allowing the unconsolidated powder to be removed when the container is inclined using suitable means and when the manufacturing plate progressively rises.

In this second embodiment, the unconsolidated powder is advantageously removed under gravity to a reservoir. Next, with the reservoir being equipped with a screen to catch the manufactured components, vibrations are used to finish off separating the grains of powder from the manufactured components.

While this second embodiment of the cleaning device does not use a flow of compressed air liable to contaminate the unconsolidated powder, it does not allow the manufactured components to be cleaned perfectly either.

Specifically, under the effect of the vibrations, the finest grains of powder are liable to float up into the air in the form of a cloud and settle again on the manufactured components once the vibration stops.

In addition, in instances in which the manufactured components have complex shapes with cavities liable to contain build-ups of powder, vibration alone is not enough to break up the masses of powder which may form in these cavities during additive manufacturing.

Finally, the simple use of vibrations does not allow removal of all of the grains of powder stuck to the manufactured components in a way that, for example, manual brushing does.

BRIEF DESCRIPTION OF THE INVENTION

For this reason, the objective of the present invention is to guard against at least one of the disadvantages of the devices described in the documents of the prior art while at the same time allowing cleaning of a manufacturing plate alone or together with the components which have been manufactured on this plate and which remain attached to this plate at the end of the additive manufacturing cycle.

To this end, the subject of the invention is a device for the dry-cleaning of a plate used in additive manufacturing using powder, the device comprising a confinement enclosure, this confinement enclosure comprising at least one inlet lock for a plate, the cleaning device comprising, within this confinement enclosure, means for receiving a plate that is to be cleaned and a dry-cleaning station for the dry-cleaning of this plate.

According to the invention, the dry-cleaning station comprises means able to impose vibrations on the plate that is to be cleaned and means able to cause this plate to experience shocks.

By virtue of the application of shocks to the plate, the masses of powder liable to form in the cavities of the manufactured components break up, and by virtue of the application of vibrations, the majority of the grains of unconsolidated powder are gradually made to detach themselves from the manufactured components and from the manufacturing plate, falling under gravity off the plate or off the manufactured components.

In order to perform the dry-cleaning in a confined volume, the dry-cleaning device comprises a cleaning enclosure inside the confinement enclosure, this cleaning enclosure taking the form of a bell mounted on a base, this base comprising an opening to receive a plate that is to be cleaned, and the receiving means allowing a plate to be transported from the inlet lock to the opening of the base of the cleaning enclosure.

In a preferred alternative form of embodiment, the means able to impose vibrations and the means able to impart shocks are supported by the base of the cleaning enclosure and provided to the opening receiving the plate that is to be cleaned.

Therefore, the cleaning enclosure comprises internal means of conveying a plate between its opening and the means of the dry-cleaning station.

In order to be able to invert a plate that is to be cleaned and to recover unconsolidated powder under gravity, the cleaning enclosure is mounted with the ability to pivot about a horizontal axis, and preferably so as to be able to pivot through at least 180° inside the confinement enclosure of the dry-cleaning device.

In order to be able to modify the angle of inclination of the plate during dry-cleaning, the dry-cleaning device comprises an actuator making it possible to control the angle of rotation of the cleaning enclosure about its horizontal axis.

In order to facilitate and accelerate the recovery of unconsolidated powder, the cleaning enclosure is equipped with means of recovering powder by suction.

Because the bell of the cleaning enclosure is inverted prior to implementation of the vibration-inducing and shock-applying means, the means for recovering powder by suction are connected to the vertex of the bell of the cleaning enclosure.

Advantageously, the bell comprises a powder suction orifice between its base and its vertex, this orifice being connected to means of recovering a cloud of powder by suction and allowing the grains of powder to be sucked up from the cloud of powder which forms when the bell is inverted.

In order to improve the protection of individuals against the toxicity of certain additive manufacturing powders, the means of recovering a cloud of powder by suction are also connected to the interior volume of the confinement enclosure of the dry-cleaning device.

BRIEF DESCRIPTION OF THE DRAWINGS

Further features and advantages of the invention will become apparent from the following description. This description, which is given by way of non-limiting example, refers to the appended drawings, in which.

DETAILED DESCRIPTION OF EMBODIMENTS OF THE INVENTION

The present invention relates to the cleaning of additive manufacturing plates 10.

An additive manufacturing plate 10 takes the form of a parallelepipedal support, generally made of metal, and a few centimetres high and a few tens of centimetres long and wide in a plane P10.

As is known, such a plate 10 is used as a support in the manufacture of the components that are to be manufactured inside the manufacturing chamber of an additive manufacturing machine. More specifically, the plate is mounted inside a manufacturing enclosure surrounding the plate in this manufacturing chamber, and the plate is mounted with the ability to move in vertical translation in this manufacturing enclosure so as to be able to be lowered before each further deposit of a layer of unconsolidated powder.

Figure 1:
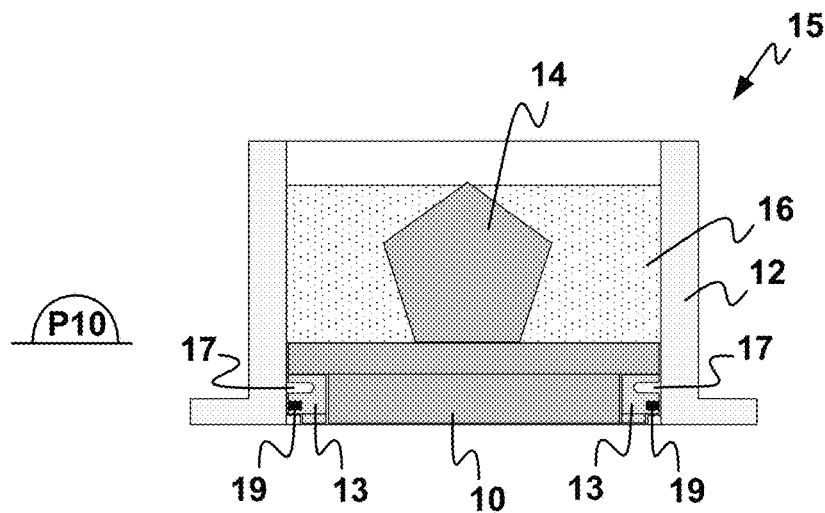
FIG. 1 is a schematic view of an additive manufacturing plate that is to be cleaned, the plate being equipped with a support and with a sleeve.

As shown by FIG. 1, in the context of the present invention, the plate 10 is preferably surrounded by a sleeve 12 acting as a manufacturing enclosure inside an additive manufacturing machine.

By being assembled with one another, the plate 10 and the sleeve 12 form a container 15. This container 15 is mounted removably inside an additive manufacturing machine so that it can be taken out of the manufacturing chamber of this machine together with the manufactured components 14 and the unconsolidated powder 16 surrounding them.

Advantageously, this container 15 makes it easier for the manufactured components 14 and the unconsolidated powder 16 to be transported from an additive manufacturing machine to another device present in an additive manufacturing shop or to a cleaning installation like the one proposed by the present invention.

The plate 10 is fitted with a support 13 for the purposes of guidance and automated transfer. This support 13 takes the form of a frame onto which a manufacturing plate 10 fits. In order to be held in position by studs or other types of retractable pin, this support 13 comprises bores 17. Finally, this support 13 is equipped with a peripheral sealing gasket 19 to prevent any powder from escaping when the plate 10 and its support 13 are moved translationally inside the sleeve 12.

The key objectives of the present invention are to recover, without adversely affecting it, the significant amount of unconsolidated powder 16 which surrounds the components 14 in a container 15 and to rid the manufactured components 14 and the additive manufacturing plates 10 of the grains of unconsolidated powder as much as possible.

Figure 2:
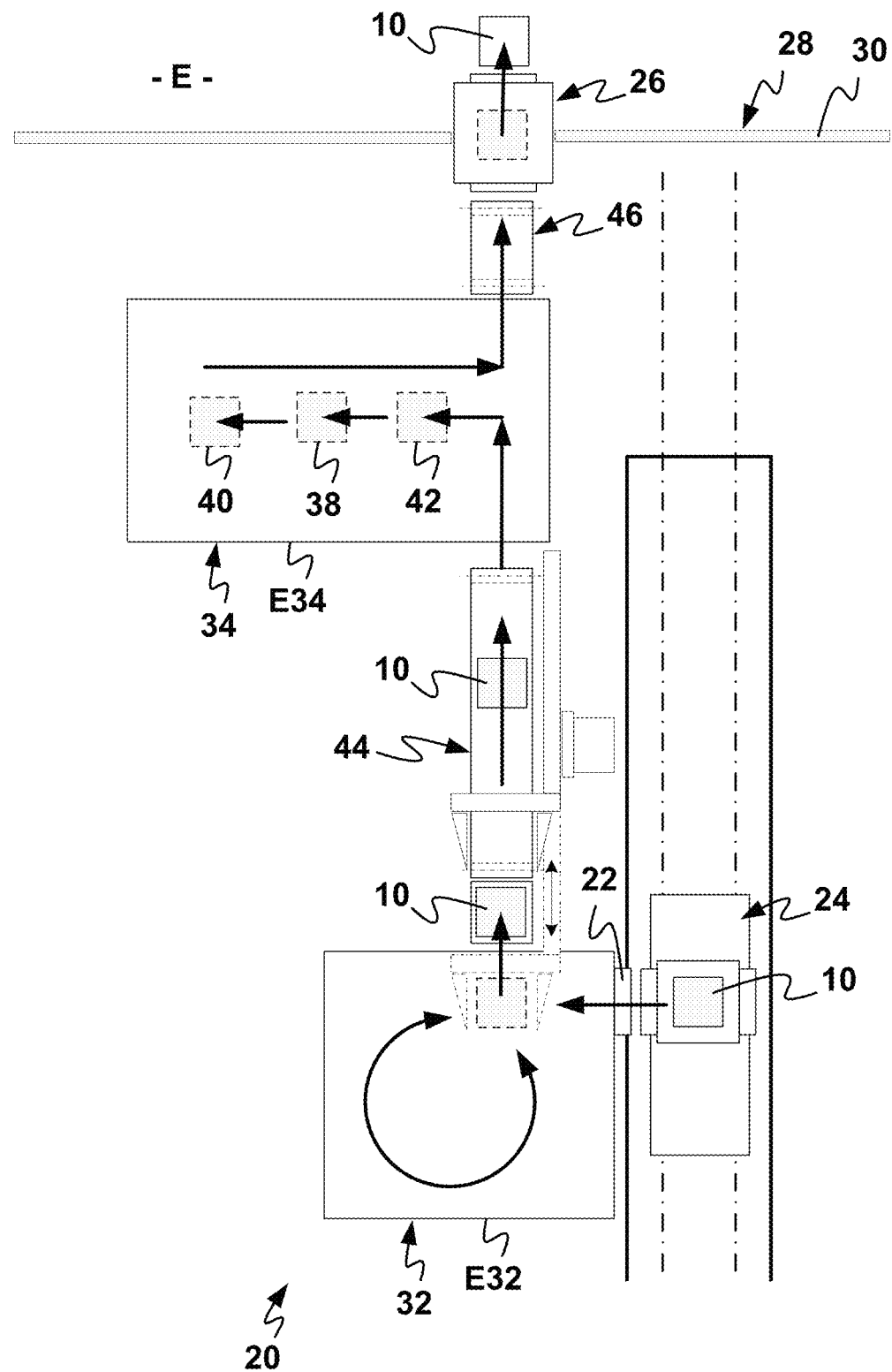
FIG. 2 is a schematic view from above of a first embodiment of a cleaning installation according to the invention, with arrows illustrating a plate cleaning cycle.

To this end, the invention provides an additive manufacturing plate cleaning installation 20 as illustrated in FIG. 2.

This installation 20 comprises an inlet lock 22 able to receive a plate 10 that is to be cleaned from an additive manufacturing machine, suitable transport means 24 being provided for transporting the container 15, the manufactured components 14 and the unconsolidated powder 16, under the best possible conditions, from an additive manufacturing machine to the inlet lock 22 of the installation.

In order to be able to extract a cleaned plate 10 from the installation, the installation 20 also comprises an outlet lock 26. Because the entirety of the installation 20 is preferably confined within a protective enclosure 28 partially depicted in FIGS. 2 to 4, the outlet lock 26 is made through a wall 30 of this enclosure 28.

Figure 3:
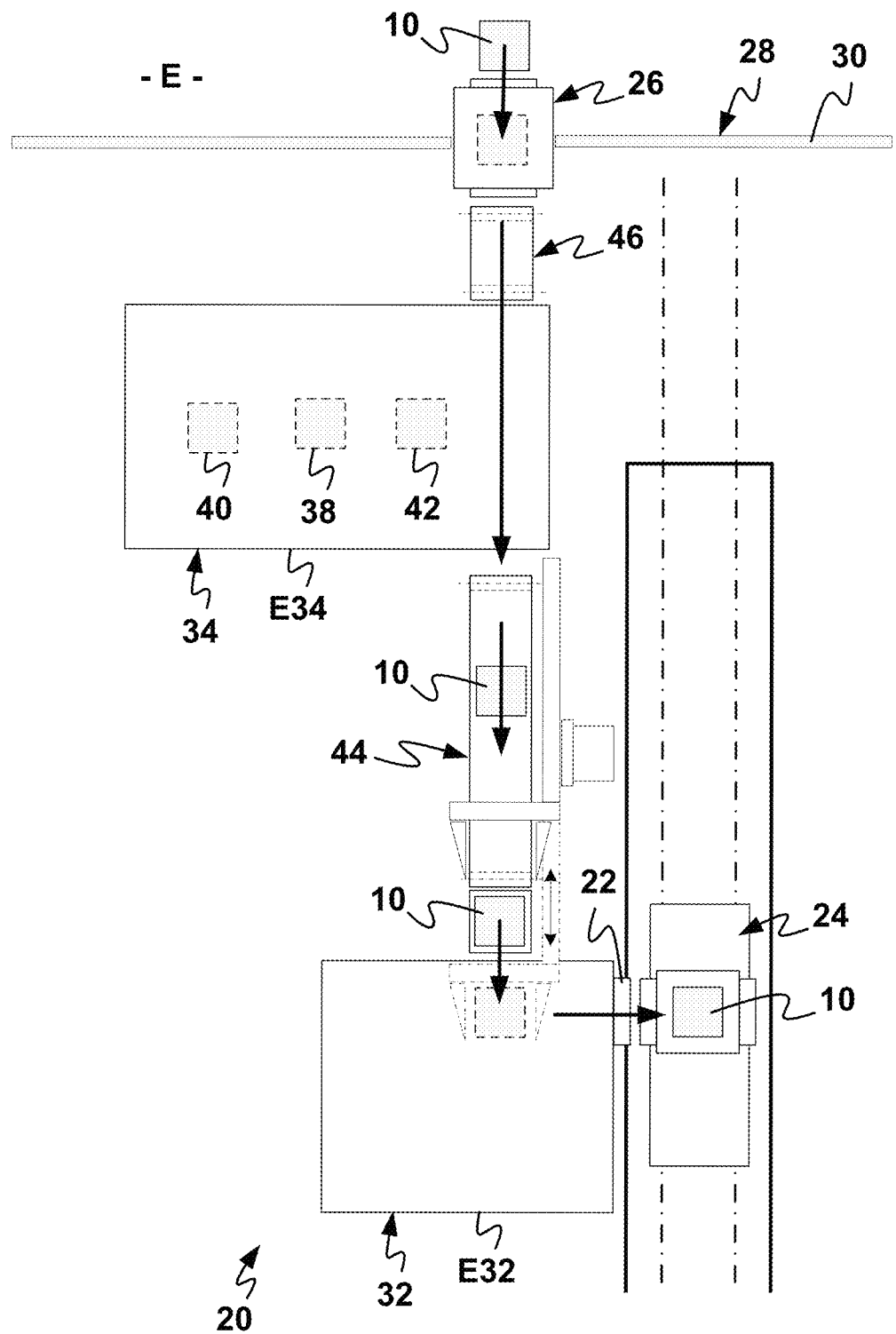
FIG. 3 is a schematic view from above of a first embodiment of a cleaning installation according to the invention, with arrows illustrating the use of the installation according to the invention to supply an additive manufacturing shop with clean and/or new plates.

As illustrated by the various arrows in FIG. 3, the outlet lock 26 may also be used for supplying the installation 20 with new and/or clean plates 10 from the outside E of the installation, and the inlet lock 22 may also be used for extracting clean plates 10 from the cleaning installation 20 so as to send them to additive manufacturing machines via the transport means 24.

In order to ensure optimal cleaning of the plates 10, the installation 20 comprises a dry-cleaning device 32 allowing a plate 10 to be cleaned using vibrations and shocks in a first confinement enclosure E32, a wet-cleaning device 34 allowing a plate 10 to be cleaned using at least one liquid in a second confinement enclosure E34, and at least one conveying device allowing a plate 10 to be transported between the dry-cleaning enclosure E32, the wet-cleaning enclosure E34 and the outlet lock 26 of the installation.

More specifically, the dry-cleaning device 32 seeks to recover the maximum amount of unconsolidated powder without adversely affecting it so that this powder can be reused as soon as possible, without prior drying treatment but with just a screening aimed at keeping control of the particle size distribution of the powder thus recycled. Following on from this, the wet-cleaning device 34 seeks to perfectly clean the manufactured components 14 and the manufacturing plates 10 by removing all the grains of unconsolidated powder which may remain stuck to the components and to the plates after the dry-cleaning.

In order to obtain perfect cleaning of the manufactured components 14 and of the manufacturing plates 10, the wet-cleaning device 34 comprises within its enclosure E34 at least one washing station 38 that washes a plate 10 with a cleaning liquid, and at least one rinsing station 40 that rinses a plate 10 with a rinsing liquid.

For preference, the washing station 38 takes the form of a tank filled with cleaning liquid and equipped with means, such as a transducer, allowing very high frequency ultrasound waves, preferably at 20 kHz and possibly at 45 kHz, to be emitted into this cleaning liquid. Thus, when the plate 10 and the components 14 that are to be cleaned are immersed in the cleaning liquid, the ultrasound waves generate, through a cavitation phenomenon, microscopic bubbles which implode under the effect of these same waves, and these implosions create turbulence in the cleaning liquid and allow the last grains of powder still stuck to the manufactured components 14 and to their manufacturing plate 10 to become detached. Advantageously, the microscopic size of the bubbles allows them to enter the smallest cavities in the manufactured components 14.

Ideally, the cleaning liquid is an aqueous solution and the rinsing liquid is also an aqueous solution.

To make the washing step easier and improve the quality of the cleaning achieved, the wet-cleaning device 34 may comprise within its enclosure E34, a pre-washing station 42 which is obviously situated upstream of the washing station 38.

This pre-washing station 42 may take the form of a tank filled with pre-washing liquid and the pre-washing liquid is preferably an aqueous solution.

The rinsing station 40 may also act as a drying station and comprise means of drying the cleaned plates and the manufactured components 14; these drying means adopting for example the form of a tank fitted with a hot air blower.

With a view to fully automating the installation, the wet-cleaning device 34 comprises, within its enclosure E34, conveying means (not depicted) allowing the plates 10 that are to be cleaned and the manufactured components 14 attached to these plates 10 to be conveyed in an automated manner between the various pre-washing 42, washing 38, and rinsing 40, stations.

In an alternative form of embodiment which has not been illustrated in the figures, the wet-cleaning device 34 may comprise a single working chamber in which the plates 10 can be pre-washed, washed and possibly dried, and various storage chambers for storing the plates 10 before, between and/or after these various steps.

As illustrated by FIG. 3, the conveying means of the wet-cleaning device 34 also allow new and/or clean plates 10 to be conveyed through the enclosure E34 of the wet-cleaning device 34, without passing via the various washing and rinsing stations.

In a first embodiment of the installation which embodiment is illustrated in FIGS. 2 and 3, the installation comprises a first conveyor 44 allowing plates 10 in the process of being cleaned to be transported from the enclosure E32 of the dry-cleaning device 32 towards the enclosure E34 of the wet-cleaning device 34, and a second conveyor 46 allowing the cleaned plates 10 to be transported from the enclosure E34 of the wet-cleaning device 34 towards the outlet lock 26 of the installation 20.

With a view to using the outlet lock 26 of the installation for introducing new and/or clean plates 10 to an additive manufacturing shop via the cleaning installation 20, the second conveyor 46 also allows plates 10 to be transported from the outlet lock 26 of the installation 20 towards the enclosure E34 of the wet-cleaning device 34, and the first conveyor 44 also allows plates 10 to be transported from the enclosure E34 of the wet-cleaning device 34 towards the enclosure E32 of the dry-cleaning device 32.

When the installation 20 is being used in this way for supplying an additive manufacturing shop with new and/or clean plates 10, provision may be made for these plates 10 to undergo wet cleaning in the wet-cleaning device 34. This then ensures perfect cleaning and decontamination of these plates 10 before they are used in an additive manufacturing machine, it being possible for these plates 10 to have become contaminated on the outside E of the enclosure 28 of the installation 20 during unprotected storage or during manual handling.

In this first embodiment of the installation 20, the two conveyors 44, 46 may be belt conveyors.

Figure 4:
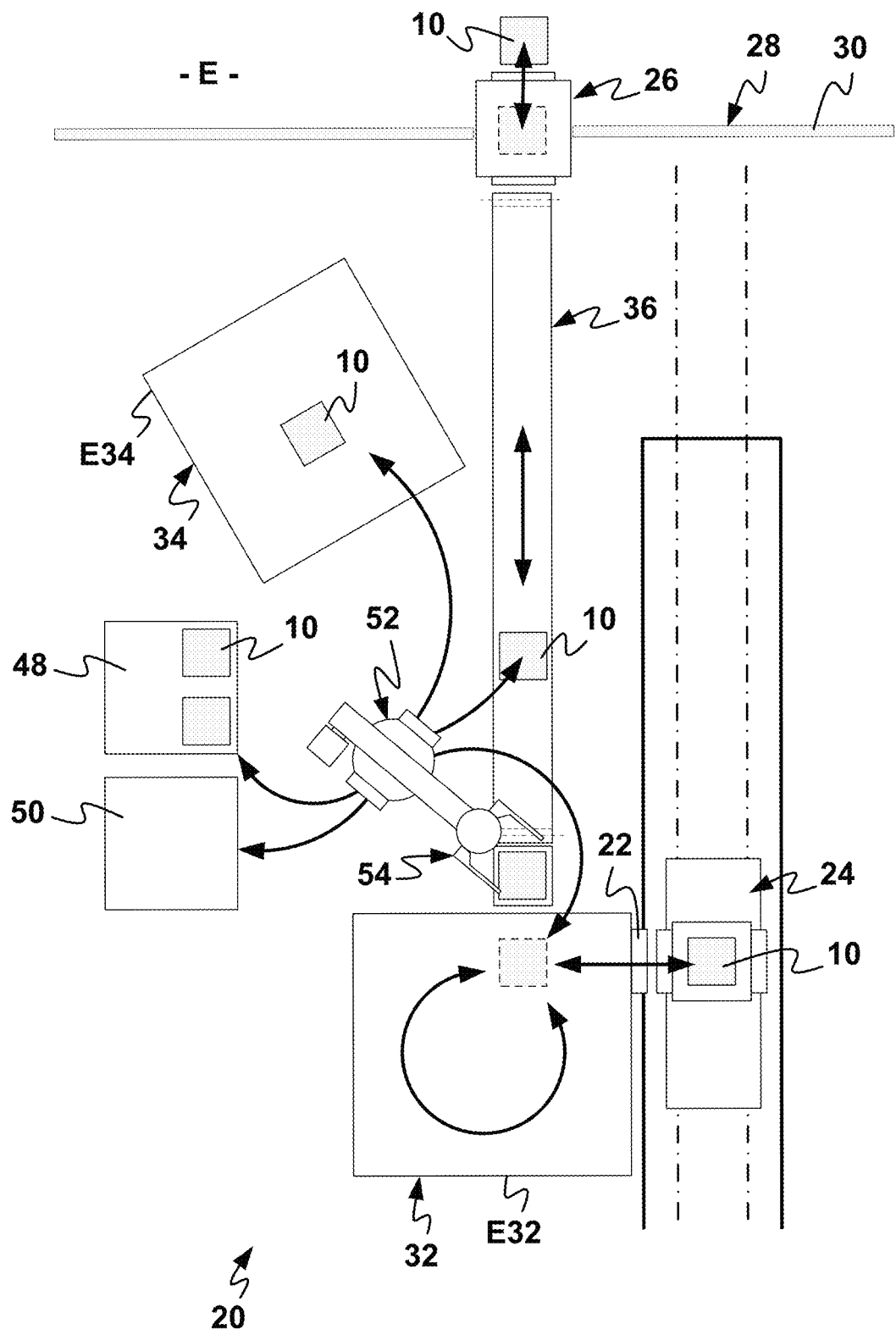
FIG. 4 is a schematic view from above of a second embodiment of a cleaning installation according to the invention, with arrows illustrating a plate cleaning cycle and the use of the installation according to the invention to supply an additive manufacturing shop with clean and/or new plates.

In a second embodiment of the installation 20, which embodiment is illustrated in FIG. 4, the installation comprises a conveyor 36 allowing plates 10 to be transported from the enclosure E32 of the dry-cleaning device 32 towards the outlet lock 26 and vice versa, from the outlet lock 26 towards the enclosure E32 of the dry-cleaning device 32, at least one storage zone 48, 50 for the temporary storage of plates 10, and a manipulator arm 52 allowing a plate 10 to be moved between the dry-cleaning device 32, the wet-cleaning device 34, the conveyor 36 and each temporary storage zone 48, 50.

More specifically, the conveyor 36 may be a belt conveyor, each storage zone 48, 50 may take the form of an open storage device such as a rack, and the manipulator arm 52 is an articulated arm on the end of which there is mounted a device 54 for gripping a plate 10, such as a gripper for example.

By virtue of the presence of at least one storage zone 48, 50, the manipulator arm 52 makes it possible for example to manage the steps of dry-cleaning and wet-cleaning various plates 10 while the conveyor 36 is used to transfer clean plates 10 from the outlet lock 26 to the dry-cleaning device 32.

For preference, there are two temporary storage zones 48 and 50, so that clean plates 10 and plates 10 in the process of being cleaned do not have to be stored in the one same zone.

Again for preference, the manipulator arm 52 is able to move in rotation about various horizontal and/or vertical axes so as to move each plate 10 from one point to another as quickly as possible.

According to an unillustrated and more economical alternative form of this second embodiment, the manipulator arm 52 may be omitted and the conveyor 36 may be arranged in such a way as to perform on its own the transportation of the plates 10 between the dry-cleaning enclosure E32, the wet-cleaning enclosure E34 and the outlet lock 26 of the installation.

In order to perform the dry-cleaning of the plates 10 using shocks and vibrations, the invention proposes a device 32 for the dry-cleaning of a plate 10.

As indicated previously, this dry-cleaning device 32 comprises a confinement enclosure E32. In order to receive a plate 10 that is to be cleaned, this confinement enclosure E32 comprises at least one inlet lock 56 and in order to discharge a cleaned plate 10, this confinement enclosure E32 also comprises an outlet lock 58. Advantageously, the inlet lock 56 of the enclosure E32 of the dry-cleaning device 32 is also the inlet lock 22 of the installation 20.

Because the dry-cleaning enclosure E32 is formed on the ground S by a front wall 60F, a rear wall 60R, a left lateral wall 62G, a right lateral wall 62D and a roof P, the inlet lock 56 is made through the rear wall 60R of the dry-cleaning enclosure E32, and the outlet lock 58 is made through the right lateral wall 62D of the dry-cleaning enclosure E32.

Figure 5:
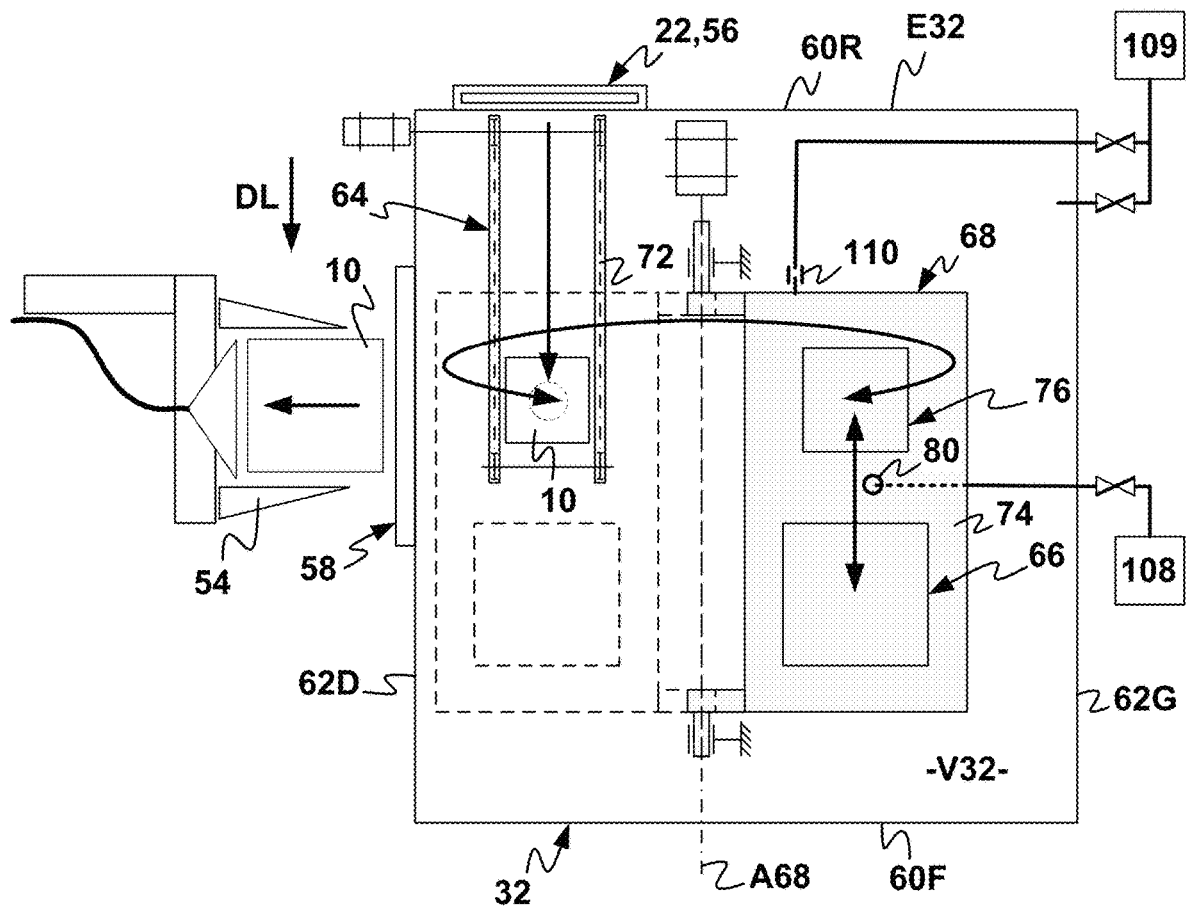
FIG. 5 is a schematic view from above of a dry-cleaning device according to the invention.

As illustrated in FIG. 5, inside this confinement enclosure E32, the dry-cleaning device 32 comprises receiving means 64 for receiving a plate 10 that is to be cleaned, and a dry-cleaning station 66 for dry-cleaning this plate.

More specifically, the receiving means 64 make it possible to receive and transport a container 15 formed of a plate 10 that is to be cleaned, of its support 13 and of its sleeve 12.

These receiving means 64 take, for example, the form of a chain conveyor 72. This chain conveyor 72 extends horizontally inside the dry-cleaning enclosure E32 and in a longitudinal direction DL parallel to the planes of the lateral walls 62G, 62D of the enclosure E32 and perpendicular to the front 60F and rear 60R walls of this enclosure. Thus, this chain conveyor 72 allows a container 15 and, therefore, a plate 10 that is to be cleaned, to be transported from the inlet lock 56 of the enclosure E32 to the dry-cleaning station 66.

In order to make it easier to recover unconsolidated powder 16 contained in a container 15, the dry-cleaning device 32 comprises a second cleaning enclosure 68 inside its first confinement enclosure E32.

This second cleaning enclosure 68 takes the form of a bell 70 mounted on a base 74, and this base 74 comprises an opening 76 to receive a plate 10 that is to be cleaned.

More specifically, the base 74 is substantially planar and rectangular, while the bell 70 has the shape of a pyramid S70 extending about a central axis A70 perpendicular to the plane P74 of the base 74. In parallel with that, the opening 76 is of a shape and size that are tailored or can be tailored to suit the shape and size of the plates 10 that are to be cleaned.

The pyramid shape of the bell 70 about its central axis A70 makes it easier for the unconsolidated powder 16 to flow and be recovered when this bell 70 is inverted with a plate 10 that is to be cleaned.

In a preferred alternative form of embodiment illustrated in FIGS. 6 to 9, the bell 70 comprises a bottom part 70B that is parallelepipedal about its central axis A70, and a top part 70H that is pyramid-shaped about its central axis A70, the parallelepipedal bottom part 70B extending from the base 74 and the pyramid-shaped top part 70H extending between this bottom part 70B and the vertex 78 of the bell 70.

In other alternative forms, the bell may also adopt an entirely pyramidal shape, a partially or entirely conical shape, a partially or entirely frustoconical shape, or any other shape making it possible to form a funnel when the bell 70 is inverted.

Figure 8:
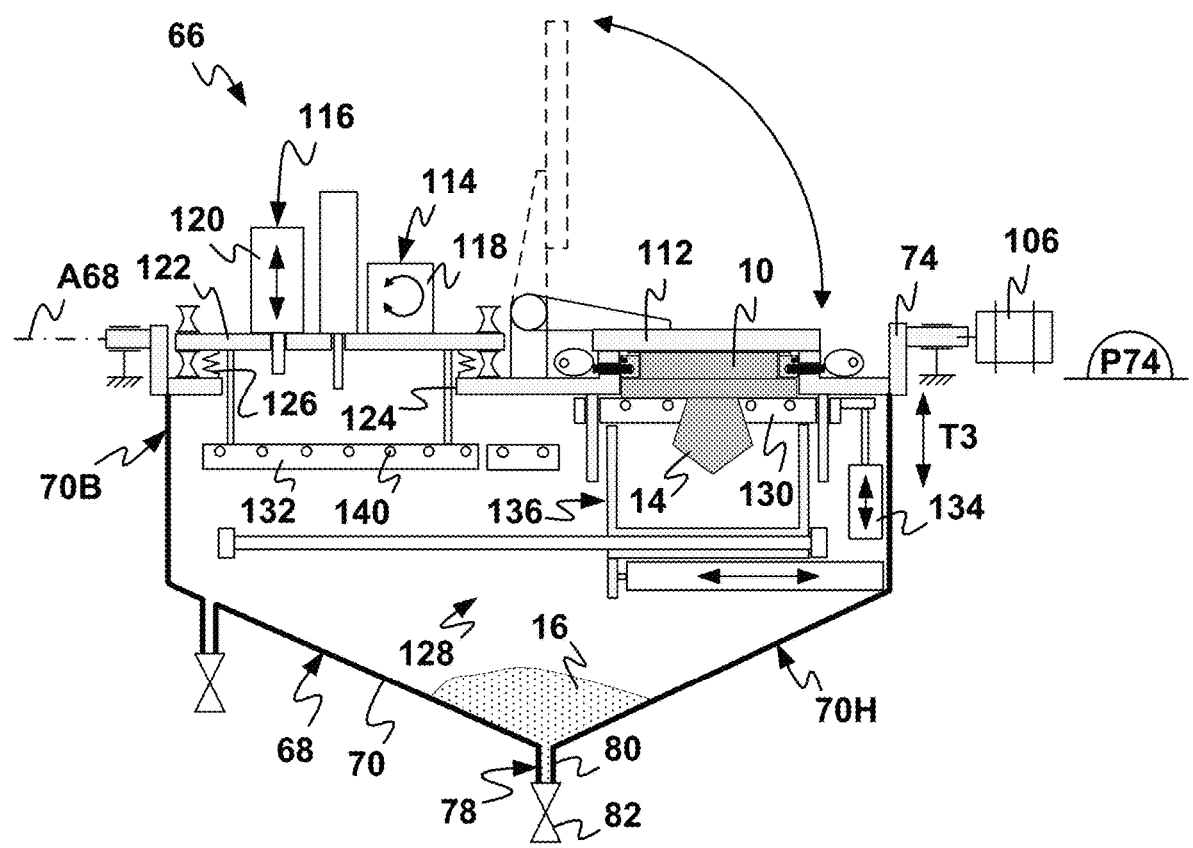
FIG. 8 is a schematic side view of the cleaning enclosure of the dry-cleaning device according to the invention, this view also illustrating the turning-over of the plate that is to be cleaned that the invention makes provision for, and FIG. 9 is also a schematic side view of the cleaning enclosure of the dry-cleaning device according to the invention, but this view more particularly illustrates the cleaning of the plate that is to be cleaned by the dry-cleaning device according to the invention.
Figure 9:
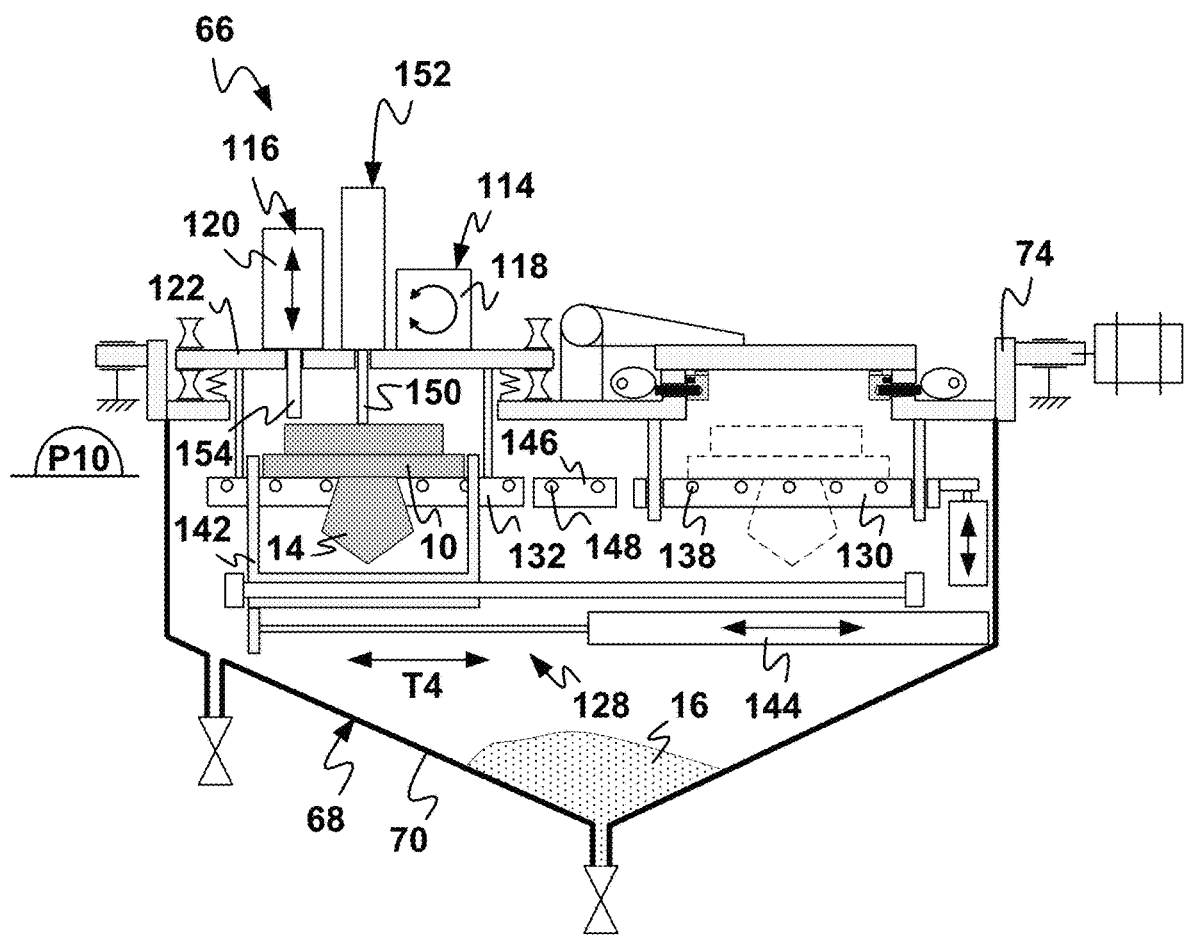

In order to control the flow of the unconsolidated powder 16 when the bell 70 is inverted in such a way that its base 74 is situated above its vertex 78, as illustrated by FIGS. 8 and 9, the vertex 78 of the bell 70 takes the form of a pipe 80 fitted with a valve 82 or with any other flow regulating device.

As has just been indicated, the invention makes provision for the bell 70 and the plate 10 to be inverted so that the unconsolidated powder 16 surrounding the manufactured component or components 14 can be recovered into a container 15.

However, first of all, it is necessary to bring the container 15 containing the plate 10 that is to be cleaned and the unconsolidated powder 16 that is to be recovered towards the opening 76 of the base 74 of the cleaning enclosure 68.

To achieve that, provision is made for the cleaning enclosure 68 to be in an initial position corresponding to a non-inverted position in which the bell 70 and its vertex 78 are situated above the base 74. In this initial position of the cleaning enclosure 68, the plane P74 of the base 74 is substantially horizontal, as illustrated in FIGS. 6 and 7.

Next, the receiving means 64 allow a container 15, and therefore a plate 10, to be transported from the inlet lock 56 of the confinement enclosure E32 to opposite the opening 76 of the base 74 of the cleaning enclosure 68 when this cleaning enclosure 68 is in its initial position.

To complement the receiving means 64, the dry-cleaning device 32 comprises a lift 84 allowing a plate 10 that is to be cleaned to be carried from the receiving means 64 as far as the opening 76.

Figure 6:
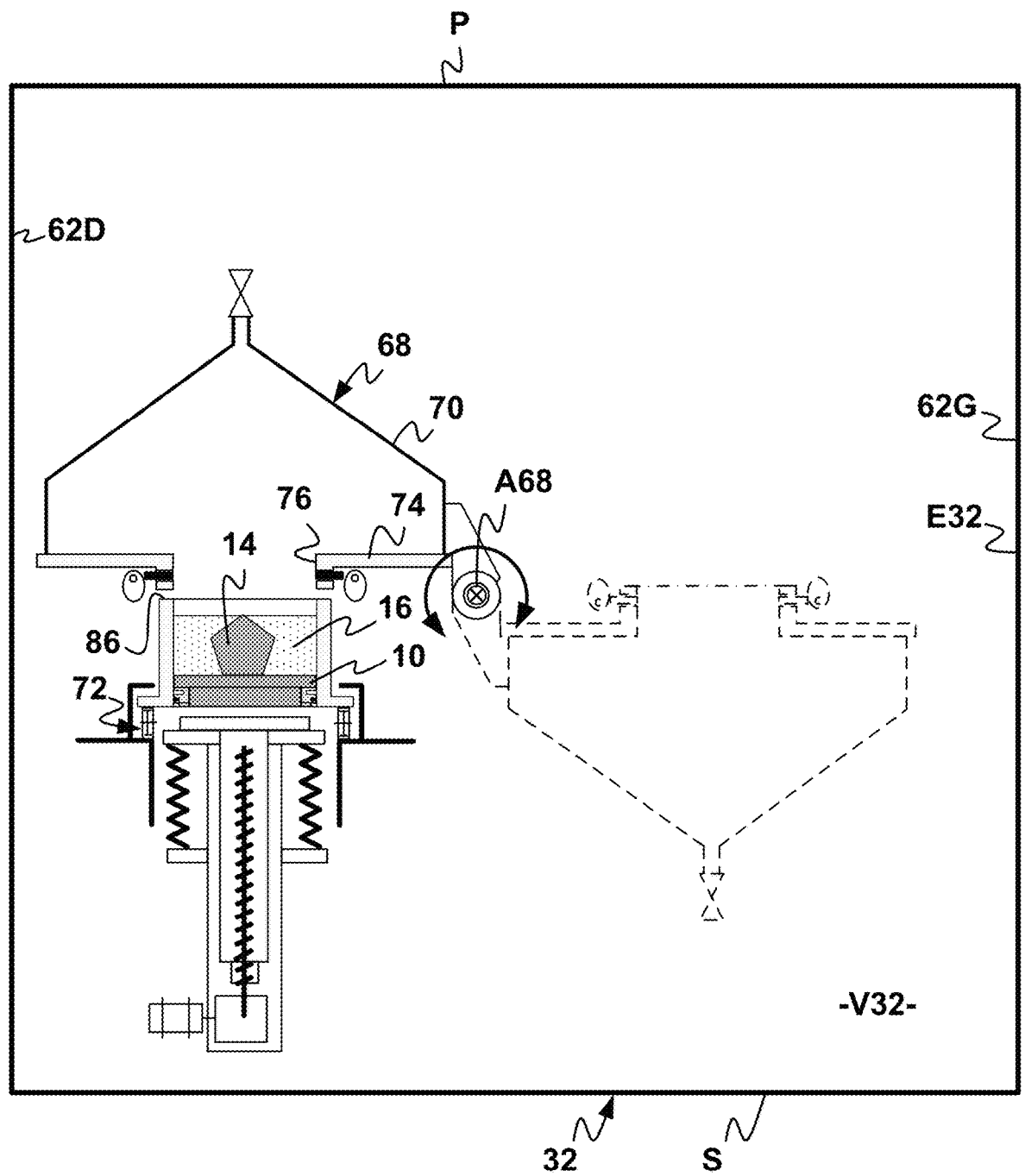
FIG. 6 is a schematic front view of a dry-cleaning device according to the invention, this view also illustrating receipt by the dry-cleaning device of an additive manufacturing plate that is to be cleaned.
Figure 7:
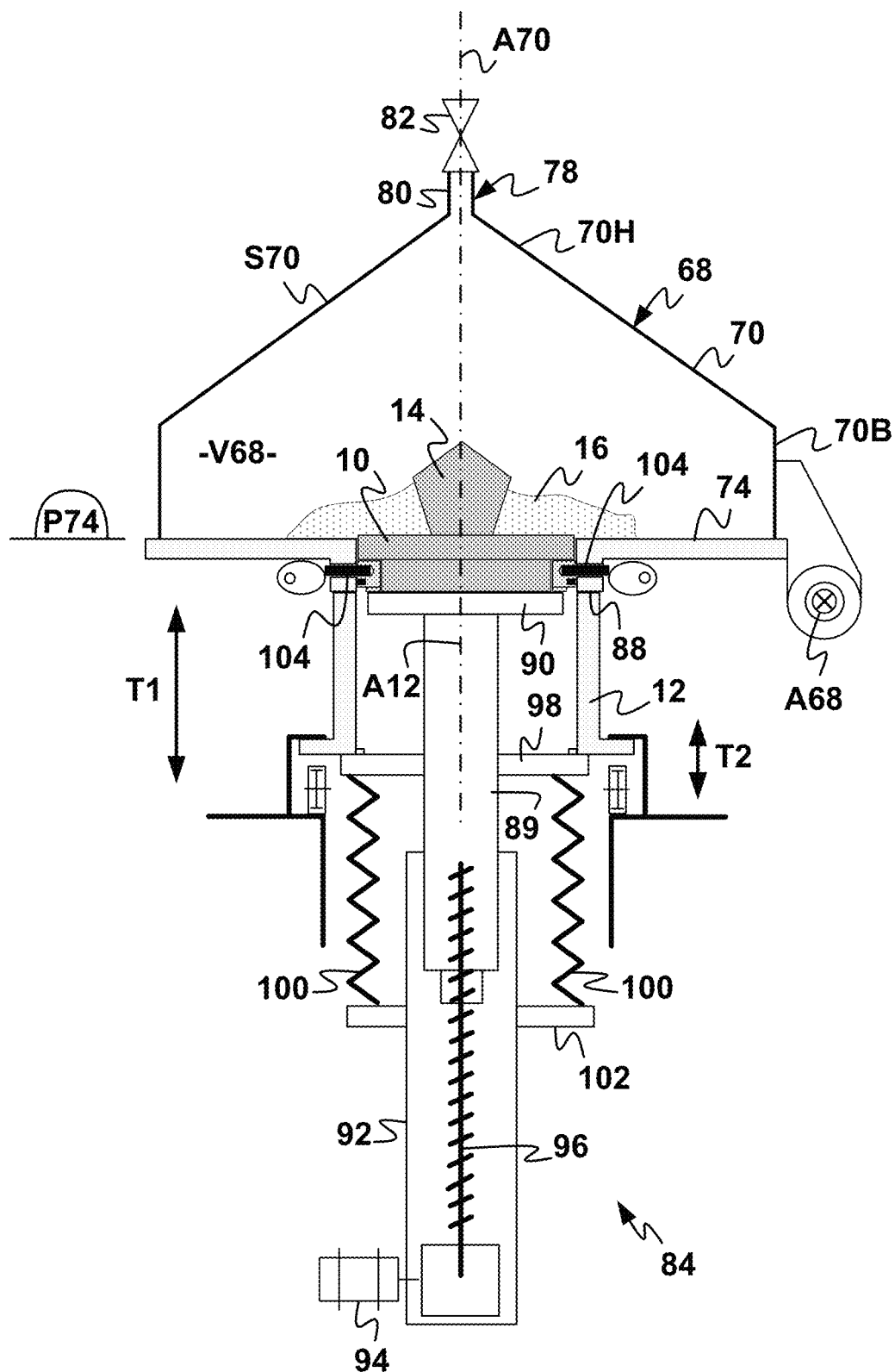
FIG. 7 is a view of a detail of FIG. 6, this view also illustrating the arrival of the plate that is to be cleaned in the cleaning enclosure of the dry-cleaning device.

For this purpose and as illustrated by FIGS. 6 and 7, this lift 84 allows the plate 10 that is to be cleaned and the support 13 thereof, to be moved in vertical translation T1 inside the sleeve 12 of the container 15. More specifically, with the sleeve 12 extending vertically heightwise about a central axis A12, the vertical translational movement T1 of the plate 10 and of its support 13 takes place parallel to the central axis A12 of the sleeve 12 and towards the upper edge 86 of the sleeve 12.

In parallel with the vertical translational movement T1 applied to the plate 10 and to its support 13, the lift 84 allows the sleeve 12 to be moved in a vertical translational movement T2 parallel to its central axis A12 and towards the base 74 of the cleaning enclosure 68. Thus, the upper edge 86 of the sleeve 12 is pressed firmly against the lower edge 88 of the opening 76 of the base 74, thereby making it possible to prevent any unconsolidated powder 16 from escaping when the plate 10 rises in the sleeve 12 and as this powder is progressively transferred from the container 15 towards the interior volume V68 of the cleaning enclosure 68.

In order to achieve the vertical translational movement T1 of the plate 10 and of its support 13, the lift 84 for example comprises a piston 90 guided in translational movement inside a body 92 and driven with a translational movement by a motor 94 and an endless screw 96.

In order to achieve the translational movement T2 of the sleeve 12, the lift 84 for example comprises a plate 98 guided in translational movement about the rod 89 of the piston 90 and driven with a translational movement by compression springs 100 pressed against another plate 102 fixed to the body 92.

Advantageously, the plates 98, 102 and the springs 100 are dimensioned and positioned relative to the body 92 and to the piston 90 in such a way that translational movement applied to the piston 90 by the motor 94 also causes a translational movement of the plate 98 under the action of the springs 100.

Once the plate 10 has reached the plane P74 of the base 74, the translational movement T1 of the plate is halted, and locking elements such as studs 104 immobilize the support 13 in the opening 76 of the base 74, these studs 104 for this purpose entering the bores 17 provided in the support 13.

Advantageously, in this position of the plate 10 relative to the base 74, the peripheral sealing gasket 19 of the support 13 also provides sealing between the support 13 and the base 74 and therefore between the plate 10 and the base 74.

When the plate 10 is secured to the base 74, the manufactured component or components 14 and the unconsolidated powder 16 find themselves inside the interior volume V68 of the cleaning enclosure 68, and this means that it is conceivable for this cleaning enclosure 68 to be inverted so that the unconsolidated powder 16 can be recovered under gravity and for the plate 10 and the manufactured component or components 14 to be dry-cleaned.

In order for this inversion to be possible, the cleaning enclosure 68 is mounted with the ability to pivot about an axis A68, preferably horizontal.

As illustrated in FIG. 8, when the cleaning enclosure 68 is in its inverted position, the plane P74 of the base 74 is substantially horizontal. For this reason, the cleaning enclosure 68 is mounted with the ability to pivot through at least 180° inside the confinement enclosure E32 of the dry-cleaning device 32.

In order to allow the installation to be fully automated, an actuator such as an electric motor 106 allows the enclosure 68 to be driven in rotation about its axis A68.

Advantageously, this actuator 106 makes it possible to control the angle of rotation of the cleaning enclosure 68 about its axis A68, for example so as to modify the inclination of the base 74 and therefore of the plate 10 during the dry-cleaning cycle.

When the cleaning enclosure 68 is inverted, the unconsolidated powder 16 drops under gravity towards the vertex 78 of the bell 70, thereby making this powder easy to recover via the pipe 80.

For preference and as illustrated by FIG. 5, powder recovery means 108 that recover powder by suction are connected to the pipe 80 at the vertex of the bell 70 via the valve 82, the suction encouraging the flow of powder in the pipe 80, thereby making it possible to prevent the pipe from clogging.

In order to suck up the grains of powder from the cloud of unconsolidated powder 16 that forms in the interior volume V68 of the cleaning enclosure when this enclosure 68 is inverted, the bell 70 comprises a suction orifice 110 between its base 74 and its vertex 78, this orifice 110 being connected to means 109 of recovering a cloud of powder by suction.

For preference, this orifice 110 is provided mid-way up the height of the bell 70. In a preferred alternative form illustrated by FIGS. 6 to 9, this orifice 110 is provided in the pyramid-shaped top part 70H of the bell 70, but near the parallelepipedal bottom part 70B.

In order to collect any grains of powder that might escape from a container 15 while it is being transported between the inlet lock 56 of the confinement enclosure E32 and the cleaning enclosure 68, or from the enclosure 68 when it is inverted for example, the means 109 for recovering a cloud of powder by suction are also connected to the interior volume V32 of the confinement enclosure E32 of the dry-cleaning device 32.

Compared with the means 108 of recovering powder by suction, the means 109 of recovering a cloud of powder by suction offer a higher suction flow rate.

In order to seal the cleaning enclosure 68 hermetically after it has been inverted with the plate 10 that is to be cleaned, this cleaning enclosure 68 comprises a door 112 that allows the opening 76 of the base 74 to be closed off. This door 112 is mounted with the ability to pivot with respect to the base 74 and closes off the enclosure 68 just behind the plate 10 and its support 13. In order to fully automate the installation, the moving of this door 112 is also fully automated.

Thanks to the inverting of the cleaning enclosure 68 and of the plate 10 that is to be cleaned and to the pyramid-shaped part 70H of this enclosure 68, a large proportion of the unconsolidated powder 16 can be simply recovered under gravity via the vertex 78 of the bell 70 and preferably using suction.

However, despite this inversion and this suction, some grains of unconsolidated powder 16 may still adhere to the plate 10 and to the manufactured component or components 14, particularly when these components 14 have cavities and/or hollow shapes.

For this reason, in order to cause the grains of powder still adhering to the plate 10 or contained in the hollows or cavities of the manufactured components 14 to drop off, the dry-cleaning station 66 of the dry-cleaning device 32 comprises means 114 able to impose vibrations on the plate 10 that is to be cleaned and means 116 able to cause this plate 10 to experience shocks. As shown in FIGS. 8 and 9, these means 114 able to impose vibrations and these means 116 able to impart shocks are supported by the base 74 of the cleaning enclosure 68 and provided next to the opening 76 receiving the plate 10 that is to be cleaned.

More specifically, the means 114 able to impose vibrations for example adopt the form of an electric motor vibrator 118 and the means 116 able to apply shocks adopt for example the form of a pneumatic striker 120.

In order to prevent the vibrator 118 and the striker 120 from spreading vibrations and shocks into the base 74 and into the cleaning enclosure 68 in its entirety, this vibrator 118 and this striker 120 are mounted on a plate 122 which is mounted on suspension rubbers facing an opening 124 made in the base 74. Advantageously, sealing means 126, such as gaiters are provided between the base 74 and the plate 122.

As shown by FIG. 9, the vibrator 118 and the striker 120 come directly into contact with the plate 10, making it possible to improve the effectiveness of the cleaning and optimize the use of the vibrations and of the shocks.

Because the dry-cleaning station 66 is situated some distance away from the opening 76 receiving the plate 10 that is to be cleaned, the cleaning enclosure 68 comprises internal means 128 of conveying a plate 10 between its opening 76 and the means 114, 116 of the dry-cleaning station 66.

In a preferred alternative form illustrated in FIGS. 8 and 9, these internal means 128 of conveying a plate comprise at least a first guiding support 130, capable of translational movement, a second guiding support 132, connected to the plate 122 supporting the means 114, 116 of the dry-cleaning station 66, and transfer means 136 transferring a plate 10 from the first support 130 to the second support 132.

More specifically, the first support 130 is mounted with the ability to move translationally inside the cleaning enclosure 68, facing the opening 76 of the base 74 and its translational movement T3 is in a direction perpendicular to the plane P74 of the base, for example under the effect of an actuating cylinder 134.

In its raised position illustrated in FIG. 8, the first support 130 is able to receive the plate 10 that is to be cleaned. Once the enclosure 68 and the plate 10 have been inverted, the first support 130 is able to receive the plate 10 inverted, which means to say with the manufactured component or components 14 underneath the plate 10. For this purpose, the first support 130 takes the form of a plurality of fingers 138, spaced apart from one another and a few centimetres long. Advantageously, the fingers 138 are rounded so as to avoid powder grain retention.

Once the plate 10 has been received by the first support 130, this first support is moved in a translational movement from its raised position to a lowered position illustrated in FIG. 9 allowing the plate 10 that is to be cleaned to be transferred to the second guiding support 132.

As the second support 132 also takes the form of a plurality of fingers 140 spaced apart from one another and a few centimetres long, preferably of rounded shape, the means 136 of transferring a plate 10 take the form of a fork 142 guided in a translational movement between the first support 130 and the second support 132. The translational movement T4 of this fork 142 is in a direction parallel to the plane P74 of the base 74, and for example under the effect of an actuating cylinder 144. This fork 142 allows the plate 10 that is to be cleaned to be grasped in such a way as to cause it to slide from the fingers 138 of the first support 130 to the fingers 140 of the second support 132.

There may also possibly be provided an intermediate guide support 146 between the first support 130 and the second support 132, this intermediate support 146 also being formed of fingers 148, preferably having a rounded shape.

Once the plate 10 is present on the second support 132, the dry-cleaning by shocks and vibrations intended by the invention can take place. However, and prior to the application of vibrations and shocks, the rod 150 of an actuating cylinder 152 supported by the plate 122 of the dry-cleaning station 66 clamps the plate 10 to the second support 132.

According to the invention, the application of vibrations to a plate 10 involves causing the plate 10 to oscillate at frequencies of between 40 and 150 Hz, the amplitudes of the oscillations of the plate 10 not exceeding 5 millimeters.

In the preferred alternative form of embodiment illustrated in FIGS. 8 and 9, the vibrations are generated by the vibrator 118 and transmitted to the plate 10 and to the manufactured component or components 14 via the plate 122 and the second support 132.

Still according to the invention, the shock are efficaciously applied to a plate 10 and therefore to the manufactured component or components 14 by a moving body having a kinetic energy of 20 to 25 Joules as it comes into contact with the plate 10. In addition, a plate 10 experiences a plurality of shocks at frequencies of between 15 and 25 Hz, namely from 120 to 600 shocks during the course of a dry-cleaning cycle, to give a ball-park figure.

In the preferred alternative form of embodiment illustrated in FIGS. 8 and 9, the shocks are efficaciously applied to the plate 10 by the rod 154 of the striker 120.

By virtue of the application of shocks to the plate 10, the masses of unconsolidated powder grains 16 liable to form in the cavities or hollow shapes of the manufactured components 14 break up, and by virtue of the application of vibrations, these grains of powder are extracted from the hollow shapes or cavities of the manufactured components 14 and fall under gravity towards the vertex 78 of the bell 70.

Once the cycle of induction of vibrations and application of shocks is over, the plate 10 is conveyed towards the outlet lock 58 of the dry-cleaning device 32 where it may, for example, be picked up by the gripping device 54 so as to be removed from the enclosure E32, as illustrated by FIG. 5.

In order to return from the dry-cleaning station 66 to the outlet lock 58 and, more specifically, as far as the receiving means 64, the cleaned plate 10 follows the same path as when it arrived, but in the opposite direction.

More specifically, once the clamping of the rod 154 has been released, the fork 142 returns the plate 10 from the second support 132 to the first support 130, then the first support 130 returns to the raised position so as to bring the plate 10 back into the opening 76 of the base 74. Next, the cleaning enclosure 68 is returned to its non-inverted initial position, after having taken care to open the door 112, so that the plate 10 is recovered by the lift 84 and its piston 90 which finishes conveying the cleaned plate 10 as far as the chain conveyor 72 of the receiving means 64.

By virtue of its complete automation, the cleaning installation 20 is particularly well suited to being installed in an additive manufacturing shop comprising a plurality of additive manufacturing machines.

Advantageously, the installation 20, and more particularly the dry-cleaning device 32, may be designed to clean a plate 10 on its own, namely without a sleeve 12 forming a container 15 with this plate 10.

In addition, the installation 20 and the plates 10 may also be designed in such a way as to avoid the use of supports 13 for the plates 10.

Advantageously, the two, confinement E32 and cleaning 68, enclosures of the dry-cleaning device 32 afford twofold confinement, best protecting individuals from the toxicity of certain additive manufacturing powders.

More generally, the present invention also relates to a method for the dry-cleaning of an additive manufacturing plate 10 which may for example be implemented using the dry-cleaning device 32 which has just been described.

According to the invention, this method consists in separating the unconsolidated powder 16 from a plate 10 and in collecting it by imposing vibrations on the plate and by subjecting the plate to shocks.

As indicated hereinabove, the vibrations applied to the plate 10 have frequencies preferably of between 40 and 150 Hz, and the amplitudes of the oscillations of the plate 10 under the effect of the vibrations do not exceed 5 millimeters.

In addition, a plurality of shocks are efficaciously applied to a plate 10 with the aid of a moving body having a kinetic energy of 20 to 25 Joules as it comes into contact with the plate 10.

For preference, the shocks are applied in a direction orthogonal to the plane P10 of the plate 10, and for example using the rod 154 of the striker 120. Specifically, since a plate 10 is designed to be particularly rigid in its width and in its length, it is more effective to apply these shocks perpendicularly to the plate 10 and therefore in its height.

For preference, a plate 10 experiences from 120 to 600 shocks during the course of a dry-cleaning cycle, at frequencies of between 15 and 25 Hz.

In order to encourage the grains of unconsolidated powder 16 to drop under gravity from the hollow shapes or cavities of the manufactured component or components 14, the vibrations are preferably imposed on the plate 10 in directions substantially parallel to the plane P10 of the plate 10, and for example using a vibrator 118.

Again, in order to encourage the cleaning of the plate 10 and of the manufactured components, the vibrations may be imposed on the plate 10 in directions that are substantially parallel to the plane P10 of the plate 10, but different from one another. For preference, the vibrations are imposed on the plate 10 in two directions that are parallel to the plane P10 of the plate 10 but perpendicular to one another and correspond for example to the directions extending along the length and along the width of the plate 10. This combination of vibrations in different directions is advantageous because it allows the manufactured components and their cavities to be best rid of the grains of unconsolidated powder regardless of the directions in which these components and these cavities extend parallel to the plane P10 of the plate.

With a view to optimal dry-cleaning, vibration steps and shock steps are alternated a number of times over.

Vibration steps and shock steps may potentially be performed simultaneously and to reduce the dry-cleaning cycle time.

For example, thanks to the cleaning enclosure 68 and the fact that it is mounted with the ability to rotate about a horizontal axis A68, the method comprises a prior step that consists in inverting the plate 10, this inverting allowing a large proportion of the unconsolidated powder 16 to be recovered under gravity.

Still with a view to optimal dry-cleaning and encouraging the grains of unconsolidated powder 16 to drop under gravity from the hollow shapes or cavities of the manufactured component or components 14, the dry-cleaning method may make provision to vary the inclination of the plate 10 during the steps of inducing vibrations in and/or the steps of applying shocks to the plate 10.

For example, by virtue of the cleaning enclosure 68, the dry-cleaning method is carried out in a confined volume V68, preferably a volume that is doubly confined by virtue of the confinement enclosure E32 of the dry-cleaning device 32.

Under gravity, or using means 108 for recovering powder by suction, the dry-cleaning method comprises a step subsequent to the inducing of vibrations and the application of shocks which consists in removing from this confined volume V68 the grains of unconsolidated powder 16 derived from the dry-cleaning of the plate 10, for example so that it can be stored and reused.

Advantageously, the suction intended for the recovery of the unconsolidated powder 16 that is dropped into the vertex 78 of the bell 70 is in operation for only a few seconds.

For example by virtue of the means 109 of recovering a cloud of powder which are connected to the dry-cleaning enclosure 68, the method makes provision for the confined volume V68 to be subjected to additional suction during cleaning, this additional suction having the intended purpose of eliminating any clouds of powder that might form inside the dry-cleaning enclosure 68 during a dry-cleaning cycle.

For preference, the additional suction is at least maintained in the dry-cleaning enclosure 68 during the vibrating of a plate 10 and during the application of shocks to the plate 10.

Finally and, for example by virtue of the means 109 of recovering a cloud of powder which are connected to the confinement enclosure E32 of the dry-cleaning device 32, the method makes provision for the confinement volume V32 of the dry-cleaning device 32 also to be subjected to additional suction.

It may be noted that the dry-cleaning device 32 inverts and cleans only the plate 10 and the manufactured components attached to this plate 10. Specifically, there is no benefit in inverting and cleaning the sleeve 12 because the translational movement of the plate 10 with its support 13 and the sealing gasket 19 is enough to rid the internal walls of the sleeve 12 of any grains of unconsolidated powder. In addition, inverting the sleeve 12 with the plate 10 would represent an additional, and therefore unnecessary, power consumption.

According to one advantage, the dry-cleaning device 32 allows the plate 10 and the manufactured components to be separated from the sleeve 12 so as to transfer only the plate 10 and the manufactured components to the wet-cleaning device 34. This is because wet-cleaning of the sleeves 12 is unnecessary.

The invention claimed is:

1. A device for dry cleaning a plate used in additive manufacturing process involving powder, the device comprising:
   a confinement enclosure;
   an entry lock configured to allow a plate to be cleaned to be placed into the confinement enclosure;

a loader structured to receive and transport the plate, the loader being positioned in the confinement enclosure; and a dry-cleaning station structured to perform dry cleaning of the plate, the dry-cleaning station being positioned in the confinement enclosure, wherein the dry-cleaning station includes: a vibration device structured to impose vibrations on the plate, and a shock device structured to cause the plate to experience shocks, wherein the vibration device is configured such that the vibrations have a frequency between 40 and 150 Hz and cause an amplitude of vibration not exceeding 5 mm, and wherein the shock device causes the plate to experience the shocks by using a moving body having a kinetic energy of 20 to 25 Joules as the moving body comes into contact with the plate.

2. The device according to claim 1, further comprising a cleaning enclosure positioned inside the confinement enclosure, the cleaning enclosure being structured as a bell mounted on a base, wherein the base includes an opening structured to receive the plate therethrough, and wherein the loader is structured to transport the plate from the entry lock to the opening of the base.

3. The device according to claim 2, wherein the vibration device and the shock device are supported by the base and positioned next to the opening in the base.

4. The device according to claim 3, wherein the cleaning enclosure includes an internal conveyor structured to transport the plate between the opening in the base and the vibration device and the shock device.

5. The device according to claim 2, wherein the cleaning enclosure is pivotably mounted to be able to pivot about a horizontal axis.

6. The device according to claim 5, wherein the cleaning enclosure is pivotably mounted to be able to pivot through at least 180° inside the confinement enclosure.

7. The device according to claim 5, further comprising an actuator for controlling an angle of rotation of the cleaning enclosure about the horizontal axis.

8. The device according to claim 2, wherein the cleaning enclosure includes a suction device arranged to recover powder by suction.

9. The device according to claim 8, wherein the suction device is connected to a vertex of the bell of the cleaning enclosure.

10. The device according to claim 2, wherein the bell of the cleaning enclosure includes a powder-suction orifice located between the base and a vertex of the bell, the powder-suction orifice being connected to a suction device arranged to recover a cloud of powder by suction.

11. The device according to claim 10, wherein the suction device is connected to an interior volume of the confinement enclosure.

12. The device according to claim 1, further comprising a wet-cleaning station positioned in the confinement enclosure.

13. The device according to claim 12, wherein the wet-cleaning station comprises a washing station including (a) a tank having cleaning liquid therein and (b) a transducer generating ultrasound waves.

14. The device according to claim 1, wherein the shock device is configured to apply the shocks at a frequency of 15 to 25 Hz, wherein the vibration device comprises an electric motor vibrator, wherein the shock device comprises a pneumatic striker, wherein the moving body is a rod of the pneumatic striker, wherein the vibration device and the shock device are mounted on a plate which is mounted on suspension rubbers, and wherein the plate experiences from 120 to 600 shocks during a dry-cleaning cycle.

15. The device according to claim 1, wherein the vibrations and the shocks are alternatingly applied a number of times over.

16. The device according to claim 1, wherein the vibrations and the shocks are simultaneously applied.

* * * * *